(12) United States Patent
Ono et al.

(10) Patent No.: US 12,404,589 B1
(45) Date of Patent: Sep. 2, 2025

(54) CUTTING TOOL

(71) Applicant: Sumitomo Electric Hardmetal Corp., Itami (JP)

(72) Inventors: Satoshi Ono, Itami (JP); Hideaki Kanaoka, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 18/844,411

(22) PCT Filed: Mar. 1, 2024

(86) PCT No.: PCT/JP2024/007864
§ 371 (c)(1),
(2) Date: Sep. 6, 2024

(51) Int. Cl.
*C23C 28/04* (2006.01)
*B23B 27/14* (2006.01)

(52) U.S. Cl.
CPC ............ *C23C 28/044* (2013.01); *B23B 27/14* (2013.01); *C23C 28/042* (2013.01); *B23B 2228/105* (2013.01)

(58) Field of Classification Search
None
See application file for complete search history.

(56) References Cited

U.S. PATENT DOCUMENTS

| | | |
|---|---|---|
| 2011/0003126 A1 | 1/2011 | Van Den Berg et al. |
| 2018/0258525 A1 | 9/2018 | Cho et al. |
| 2018/0304376 A1 | 10/2018 | Kawahara |
| 2018/0305823 A1 | 10/2018 | Kawahara |
| 2022/0298644 A1* | 9/2022 | Slaiwa ............... C23C 30/005 |
| 2024/0216997 A1 | 7/2024 | Okuno et al. |
| 2024/0216998 A1 | 7/2024 | Okuno et al. |
| 2024/0218504 A1 | 7/2024 | Okuno et al. |

FOREIGN PATENT DOCUMENTS

| | | |
|---|---|---|
| JP | 2013-132717 A | 7/2013 |
| JP | 2018-183862 A | 11/2018 |
| JP | 2018-183864 A | 11/2018 |
| JP | 2020-037150 A | 3/2020 |
| JP | 2020-116645 A | 8/2020 |
| WO | 2009/112116 A1 | 9/2009 |
| WO | 2022/244241 A1 | 11/2022 |
| WO | 2022/244242 A1 | 11/2022 |
| WO | 2022/244243 A1 | 11/2022 |

OTHER PUBLICATIONS

Written Opinion mailed on Apr. 16, 2024, received for PCT Application PCT/JP2024/007864, filed on Mar. 1, 2024, 6 pages including English Translation.

* cited by examiner

*Primary Examiner* — Colin W. Slifka
(74) *Attorney, Agent, or Firm* — XSENSUS LLP (57) ABSTRACT

A cutting tool including a substrate and a coated film arranged on the substrate, in which the coated film includes a first layer positioned on the substrate, a second layer positioned on the first layer, the first layer is composed of $\alpha\text{-}Al_2O_3$, the second layer is composed of TiCN, a thickness of the second layer is 0.5 μm or more and less than 2.0 μm, and a residual stress X of the second layer is −2.0 GPa or more and −0.5 GPa or less.

4 Claims, 3 Drawing Sheets

CUTTING TOOL

CROSS-REFERENCE TO RELATED APPLICATION

The present application is based on PCT filing PCT/JP2024/007864, filed Mar. 1, 2024, the entire contents of which are incorporated herein by reference.

TECHNICAL FIELD

The present disclosure relates to a cutting tool.

BACKGROUND ART

Conventionally, cutting tools including a substrate and a coated film arranged on the substrate, have been used for cutting processing (Patent Literatures 1 to 6).

CITATION LIST

Patent Literature

PTL 1: Japanese Patent Laying-Open No. 2020-037150
PTL 2: Japanese Patent Laying-Open No. 2020-116645
PTL 3: WO2009/112116
PTL 4: WO2022/244241
PTL 5: WO2022/244242
PTL 6: WO2022/244243

SUMMARY OF INVENTION

The cutting tool of the present disclosure is a cutting tool including a substrate and a coated film arranged on the substrate,
  wherein the coated film comprises a first layer positioned on the substrate and a second layer positioned on the first layer,
  wherein the first layer is composed of $\alpha$-$Al_2O_3$,
  wherein the second layer is composed of TiCN,
  wherein a thickness of the second layer is 0.5 μm or more and less than 2.0 μm,
  wherein a residual stress X of the second layer is −2.0 GPa or more and −0.5 GPa or less.

DETAILED DESCRIPTION

Problem to be Solved by the Present Disclosure

In recent years, there have been increasing demands for improvement on a tool service life, and improvement on the tool service life is further demanded particularly in intermittent turning of cast iron. Examples of the important factors for further improvement of tool service life in intermittent turning of cast iron include "wear resistance" and "chipping resistance". Moreover, from the viewpoint of enhancing cutting performance of the cutting tool in intermittent turning of cast iron, a cutting tool including a substrate and a coated film arranged on the substrate, wherein the coated film includes an $\alpha$-$Al_2O_3$ layer positioned on the substrate and a TiCN layer positioned on the $\alpha$-$Al_2O_3$ layer, is used. In the cutting tool, in relation to the $\alpha$-$Al_2O_3$ layer being formed by a CVD method, the TiCN layer is formed by the CVD method. Herein, the TiCN layer contributes to "wear resistance" of the coated film and "chipping resistance" of the coated film. Moreover, in particular from the viewpoint of improving "wear resistance," a cutting tool is used in which a thickness of the TiCN layer is 0.5 μm or more and less than 2.0 μm. However, in such a cutting tool, when an attempt is made to apply a high compressive residual stress in order to exhibit superior cutting performance, due to the fact that the thickness of the TiCN layer is thin, it was sometimes difficult to achieve both excellent "wear resistance" and excellent "chipping resistance" in relation to the TiCN layer being likely to disappear by wear and tear. Therefore, by combining excellent "wear resistance" with excellent "chipping resistance", prolongation of the tool service life has been required, particularly even in intermittent turning of cast iron.

Therefore, an object of the present disclosure is to provide a cutting tool having a long tool service life, particularly even in intermittent turning of cast iron with a black skin material.

Advantageous Effect of the Present Disclosure

According to the present disclosure, a cutting tool having a long tool service life, particularly even in intermittent turning of cast iron with a black skin material, can be provided.

DESCRIPTION OF EMBODIMENTS

Embodiments of the present disclosure will be first described by listing them.
  (1) The cutting tool of the present disclosure is a cutting tool comprising a substrate and a coated film arranged on the substrate,
    wherein the coated film includes a first layer positioned on the substrate and a second layer positioned on the first layer,
    wherein the first layer is composed of $\alpha$-$Al_2O_3$,
    wherein the second layer is composed of TiCN,
    wherein a thickness of the second layer is 0.5 μm or more and less than 2.0 μm,
    wherein a residual stress X of the second layer is −2.0 GPa or more and −0.5 GPa or less.
  According to the present disclosure, a cutting tool with a long tool service life, particularly even in intermittent turning of cast iron, can be provided.
  (2) In (1) above, the thickness of the first layer may be 3.0 μm or more and 15.0 μm or less. This can provide a cutting tool with a longer tool service life, particularly even in intermittent turning of cast iron.
  (3) in (1) or (2) above, an orientation index TC (0 0 12) of the first layer may be 3.0 or more. This can provide a cutting tool with a longer tool service life, particularly even in intermittent turning of cast iron.
  (4) In any one of (1) to (3) above, the coated film may further include a third layer positioned between the substrate and the first layer,
    wherein the third layer is composed of TiCN,
    wherein a residual stress Y of the third layer is −1.0 GPa or more and 1.0 GPa or less. This can provide a cutting tool with a longer tool service life, particularly even in intermittent turning of cast iron.

Details of Embodiments of the Present Disclosure

Specific examples of one embodiment of the present disclosure (hereinafter also referred to as "the present embodiment") will be described below with referring to the drawings. In the drawings of the present disclosure, the same reference sign represents the same portion or equivalent portion. Moreover, dimensional relationships such as a length, width, thickness, and depth have been appropriately changed for the sake of clarity and simplification of the drawings, and do not necessarily represent actual dimensional relationships.

The notation in the form "A to B" used herein refers to the upper limit and lower limit of the range (i.e., A or more and B or less), and when no unit is described in A and a unit is described only in B, the unit of A is the same as that of B.

In the present disclosure, when a compound or the like is represented by a chemical formula, and its atomic ratio is not specifically limited, the atomic ratio is assumed to include any conventionally known atomic ratios and should not necessarily be limited to only those in the stoichiometric range.

Embodiment 1: Cutting Tool

A cutting tool according to one embodiment of the present disclosure will be described using FIGS. 1 to 3.

One embodiment of the present disclosure (hereinafter also referred to as the "present embodiment") is a cutting tool 10 including a substrate 1 and a coated film 2 arranged on substrate 1, wherein coated film 2 includes a first layer 3 positioned on substrate 1 and a second layer 4 positioned on first layer 3, and, wherein first layer 3 is composed of $\alpha$-$Al_2O_3$, wherein second layer 4 is composed of TiCN, wherein a thickness of second layer 4 is 0.5 μm or more and less than 2.0 μm, wherein a residual stress X of second layer 4 is -2.0 GPa or more and -0.5 GPa or less.

According to the present disclosure, it is possible to provide cutting tool 10 with a long tool service life, particularly even in intermittent turning of cast iron. The reason therefore is presumed as follows.

(a) The thickness of second layer 4 is 0.5 μm or more and less than 2.0 μm. This can improve "wear resistance" of cutting tool 10.

(b) As described above, the thickness of second layer 4 being 0.5 μm or more and less than 2.0 μm, enables improving "wear resistance" of cutting tool 10. However, when an attempt is made to apply a high compressive residual stress in order to further enhance cutting performance of cutting tool 10, the thickness of second layer 4 being 0.5 μm or more and less than 2.0 μm singly may have allowed second layer 4 to be likely to disappear by wear and tear due to the fact that the thickness of second layer 4 is thin. Therefore, particularly even in intermittent turning of cast iron, it was sometimes difficult for cutting tool 10 with a long tool service life to achieve both excellent "wear resistance" and excellent "chipping resistance".

(c) In cutting tool 10 according to the present disclosure, residual stress X of second layer 4 is -2.0 GPa or more and -0.5 GPa or less. This can impart an excellent compressive residual stress on a surface side of a coated film from a layer composed of $\alpha$-$Al_2O_3$, (i.e., the first layer), making it possible to improve "chipping resistance" of cutting tool 10.

<<Cutting Tool>>

Figure 1:
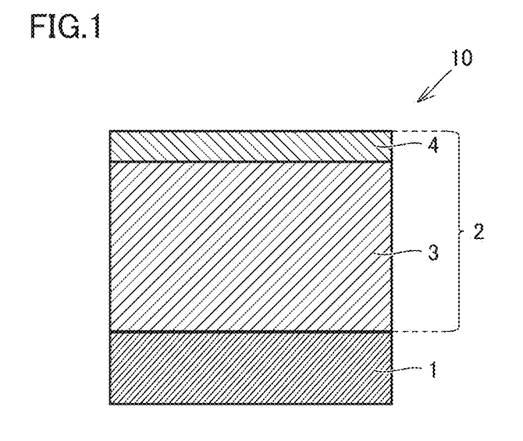
FIG. 1 is a schematic cross-sectional view illustrating one aspect of the cutting tool of the present disclosure.
Figure 2:
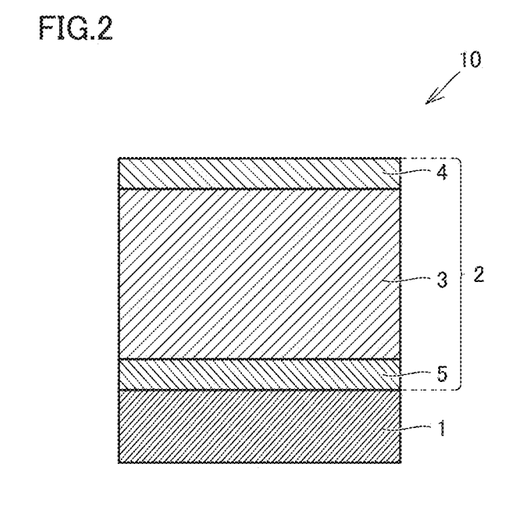
FIG. 2 is a schematic cross-sectional view illustrating another aspect of the cutting tool of the present disclosure.
Figure 3:
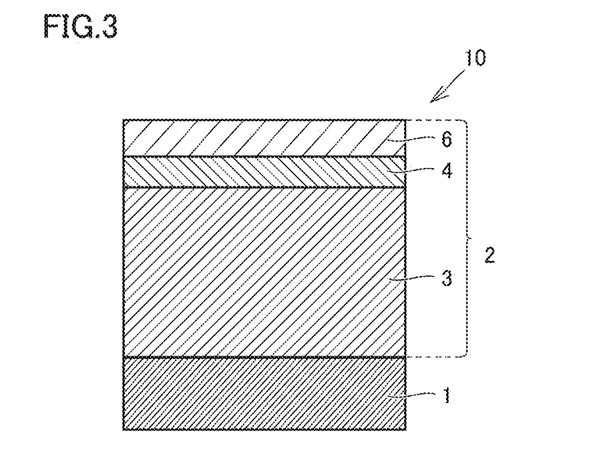
FIG. 3 is a schematic cross-sectional view illustrating yet another aspect of the cutting tool of the present disclosure.

As shown in FIGS. 1 to 3, cutting tool 10 according to one embodiment of the present disclosure includes substrate 1 and coated film 2 arranged on substrate 1. Coated film 2 preferably covers the entire surface of substrate 1, however, even if a portion of substrate 1 is not covered by coated film 2 or a composition of coated film 2 is partially different, the scope of the present embodiment shall not be deviated. In a case in which substrate 1 is not partially covered with coated film 2, coated film 2 may be arranged so as to cover a surface of a portion of substrate 1 involved at least in cutting. The portion of substrate 1 herein that is involved in cutting refers to, depending on the size and shape of substrate 1, a region surrounded by a cutting edge ridgeline of the cutting tool and a hypothetical plane in which a distance from the cutting edge ridgeline to a substrate 1 side along a perpendicular line tangent to the cutting edge ridgeline, is, for example, either 5 mm, 3 mm, 2 mm, 1 mm, or 0.5 mm.

Cutting tool 10 of the present embodiment can be suitably used as cutting tools 10 such as a drill, an end mill, an indexable cutting insert for drills, an indexable cutting insert for end mills, an indexable cutting insert for milling, an indexable cutting insert for turning, a metal saw, a gear cutting tool, a reamer, a tap, and the like.

<<Substrate>>

Substrate 1 that is any conventionally known substrate 1 of this type, can be used. For example, it is preferably any of cemented carbides (WC-based cemented carbide, cemented carbide containing WC and Co, cemented carbides further added with carbonitrides of Ti, Ta, Nb, and the like, and the like), cermets (mainly composed of TiC (titanium carbide), TiN (titanium nitride), TiCN (titanium carbonitride), or the like), high speed steel, ceramics (titanium carbide, silicon carbide, silicon nitride, aluminum nitride, aluminum oxide, and the like), a cubic boron nitride sintered material, or a diamond sintered material.

Among these various substrates 1, particularly the WC-based cemented carbide and cermet (particularly TiCN-based cermet), are preferably selected. These substrates 1 are excellent in balance between a hardness and a strength, in particular at high temperatures, whereby in the case of using substrate 1 as that of cutting tool 10, substrate 1 can contribute to a long service life of cutting tool 10.

<<Coated Film>>

Coated film 2 includes first layer 3 positioned on substrate 1, and second layer 4 positioned on first layer 3. Coated film 2 covering substrate 1 improves various properties such as wear resistance and chipping resistance of cutting tool 10, thereby having an action of prolonging a service life of cutting tool 10, Note, however, the second layer partially or entirely present on a portion involved in cutting enables demonstrating the effects of the present disclosure. Coated film 2 may be composed of first layer 3 positioned on substrate 3 and second layer 4 positioned on first layer 3. Coated film 2 may further include a third layer 5 positioned between substrate 1 and first layer 3. Coated film 2 may be composed of first layer 3 positioned on substrate 1, second layer 4 positioned on first layer 3, and third layer 5 positioned between substrate 1 and first layer 3. Coated film 2 may further include a fourth layer 6 positioned on second layer 4, Coated film 2 may be composed of first layer 3 positioned on substrate 1, second layer 4 positioned on first layer 3, and fourth layer 6 positioned on second layer 4.

Coated film 2 may be composed of first layer 3 positioned on substrate 1, second layer 4 positioned on first layer 3, third layer 5 positioned between substrate 1 and first layer 3, and fourth layer 6 positioned on second layer 4. Coated film 2 can include, in addition to first layer 3, second layer 4, and third layer 5, "other layers" as described below to the extent that the effects of the present disclosure are not impaired.

A thickness of coated film 2 may be 3.5 μm or more and 30.0 μm or less. The thickness of coated film 2 being thinner than 3.5 μm facilitates a service life of cutting tool 10 to be shortened due to the too thin thickness of coated film 2. The thickness of coated film 2 being thicker than 30.0 μm, on the other hand, facilitates chipping of coated film 2 to occur in an early stage of cutting, whereby the service life of cutting tool 10 tends to be likely to shorten. A thickness of coated film 3 can be measured by observing a cross-section of coated film 2 with a scanning electron microscope (SEM). Specifically, with observation magnification of a cross-sectional sample of 5,000 to 10,000 times and an observation area of 100 to 500 μm, thickness widths at three locations in one field of view, are measured to obtain an average value thereof and used as the "thickness". The same applies to a thickness of each layer described below, unless otherwise described.

<First Layer>
<Composition of the First Layer>

First layer 3 is composed of α-Al$_2$O$_3$ (in other words, it is composed of α-alumina). Herein, the phrase "being composed of α-Al$_2$O$_3$" means that unavoidable impurities can be included in addition to α-Al$_2$O$_3$ as long as the effects of the present disclosure are exhibited. Examples of the unavoidable impurities include, for example, chlorine atoms (Cl) and the like. The content rate of the total unavoidable impurities in first layer 3 may be greater than 0% by mass and less than 3% by mass.

First layer 3 being composed of α-Al$_2$O$_3$ is measured by an X-ray diffraction (XRD) method and an energy dispersive X-ray analysis (EDX). The content rate of unavoidable impurities in first layer 3 is measured by secondary ion mass spectrometry (SIMS). Note, however, as long as the measurement is carried out on the same cutting tool 10, it has been confirmed that there is no variation in the measurement results even if measurement points are arbitrarily selected.

<Structure of the First Layer>

A thickness of first layer 3 may be 3.0 μm or more and 15.0 μm or less. This allows cutting tool 10 to achieve both superior wear resistance and superior chipping resistance, making it possible to provide cutting tool 10 with a longer tool service life, particularly even in intermittent turning of cast iron. The thickness of first layer 3 may be 3.2 μm or more and 13.1 μm or less, or 3.5 μm or more and 10.2 μm or less.

<Orientation Index TC (0 0 12) of First Layer>

The orientation index TC (0 0 12) of first layer 3 may be 3.0 or more. This enables achievement of both superior wear resistance and superior chipping resistance, whereby cutting tool 10 with a longer tool service life, particularly even in intermittent turning of cast iron, can be provided. The orientation index TC (00 12) of first layer 3 may be 3.0 or more and 8.0 or less, 3.1 or more and 7.7 or less, or 3.2 or more and 7.4 or less.

Note, however, the phrase "orientation index TC (0 0 12) of first layer 3" used herein refers to an orientation index TC (0 0 12) of a (0 0 12) plane in first layer 3 of an orientation index TC (hkl) defined in Expression 1 below.

[Equation 1]

$$TC(hkl) = \frac{I(hkl)}{I_0(hkl)} \left\{ \frac{1}{n} \sum_{1}^{n} \frac{I(hkl)}{I_0(hkl)} \right\}^{-1} \qquad \text{Expression 1}$$

In Expression 1. 1 (hkl) indicates the X-ray diffraction intensity of a (hkl) reflection surface, and o (hkl) indicates the standard intensity according to ICDD PDF card number (10-010-0173. Moreover, n in Expression 1 indicates the number of reflection used in calculation, which is 8 in the present embodiments. The (hkl) planes used for reflection are (012), (104), (110), (0 0 12), (113), (024), (116), and (300).

ICDD (registered trademark) is an abbreviation for International Centre for Diffraction Data. PDF (registered trademark) is also an abbreviation for Powder Diffraction File.

Incidentally, the orientation index TC (0 0 12) of first layer 3 in the present embodiment can be denoted by the following Expression 2.

[Equation 2]

$$TC(0\ 0\ 12) = \frac{I(0\ 0\ 12)}{I_0(0\ 0\ 12)} \left\{ \frac{1}{8} \sum_{1}^{8} \frac{I(hkl)}{I_0(hkl)} \right\}^{-1} \qquad \text{Expression 2}$$

Therefore, the phrase "orientation index TC (0 0 12) of first layer 3 is 3.0 or more" means that the value obtained by Expression 2 above, which is obtained by substituting TC (0 0 12) into Expression 1 above, is 3.0 or more.

TC (hkl) as described above can be measured by analysis using an X-ray diffractometer. TC (hkl) can be measured using, for example, SmartLab (registered trademark) manufactured by Rigaku Holdings Corporation (scan speed: 21.7°/min, step; 0.01°, and scan range: 15 to 140°) under the following conditions. Note, however, in the present embodiment, the measurement results of TC (hkl) using an X-ray diffractometer are referred to as "XRD results."

(Conditions)

Characteristic X-ray: Cu-Kα

Tube voltage: 45 kV

Tube current: 200 mA

Filter: Multilayer mirror

Optical system: Concentration method

X-ray diffraction method: θ-2θ method

Upon using an X-ray diffractometer, a rake face of a cutting tool is irradiated with X-rays. The rake face is usually in the form of a convex and concave face, while a flank face is flat, so that in order to eliminate disturbance factors, the flank face is preferably irradiated with X-rays. In particular a portion on the flank face that extends a range of approximately 2 to 4 mm from a cutting edge ridgeline portion is irradiated with X rays. This will increase reproducibility of the results. Note, however, in the present embodiment, the orientation index TC (hkl) value of first layer 3 on a flank face of a substrate is the same as the TC (hkl) value of first layer 3 on a rake face of the substrate. In the present embodiments, it was also confirmed that the same results could be obtained by arbitrarily selecting a plurality of measurement locations on the same sample and performing the above measurement for each measurement location.

Incidentally, the orientation index TC (0 0 12) of first layer 3 can be stayed within a desired range by appropriately adjusting the content rate [% by volume] of $H_2S$ in a mixed gas of a second A step in a second embodiment described below.

<Second Layer>
<Composition of the Second Layer>

Second layer 4 is composed of TiCN. Herein, the phrase "being composed of TiCN" means that unavoidable impurities can be included in addition to TiCN as long as the effects of the present disclosure are exhibited. Examples of the unavoidable impurities include, for example, chlorine atoms (Cl) and the like. The content rate of the total unavoidable impurities in second layer 4 may be greater than 0% by mass and less than 3% by mass.

Second layer 4 being composed of TiCN is identified by an X-ray diffraction (XRD) method and an energy dispersive X-ray analysis (EDX). In second layer 4, the content rate of unavoidable impurities is measured by secondary ion mass spectrometry (SIMS). Note, however, as long as the measurement is carried out on the same cutting tool 10, it has been confirmed that there is no variation in the measurement results even if measurement points are arbitrarily selected.

<Structure of the Second Layer>

A thickness of second layer 4 is 0.5 m or more and less than 2.0 μm. This enables improvement on "wear resistance" of cutting tool 10. The thickness of second layer 4 may be 0.6 μm or more and 1.8 μm or less, or 0.7 μm or more and 1.7 μm or less.

<Residual Stress of Second Layer>

A residual stress X of second layer 4 is −2.0 GPa or more and −0.5 GPa or less. This enables improvement on "chipping resistance" of cutting tool 10. Residual stress X of second layer 4 may be −1.9 GPa or more and −0.6 GPa or less, or −1.8 GPa or more and −0.9 GPa or less.

The term "residual stress" is a type of internal stress (inherent strain) present in a layer. The residual stress is broadly classified into a compressive residual stress and tensile residual stress. The compressive residual stress refers to a residual stress represented as a "−" (minus) numerical value (denoted in units of "GPa" herein). For example, the phrase "compressive residual stress of 10 GPa" can be understood as a residual stress of −10 GPa. Therefore, the concept of a high compressive residual stress indicates that the absolute value of the above numerical value is large, and the concept of a low compressive residual stress indicates that the absolute value of the above numerical value is small. The tensile residual stress refers to a residual stress represented as a "+" (plus) numerical value (denoted in units of "GPa" herein). For example, the phrase "tensile residual stress of 10 GPa" can be understood as a residual stress of 10 GPa. Therefore, the concept of a large tensile residual stress indicates that the above numerical value is large, and the concept of a small tensile residual stress indicates that the above numerical value is small.

Residual stress X of second layer 4 can be identified by carrying out measurement on second layer 4 using a sin 2ψ method (see pp. 54 to 66 of "X-ray Stress Measurement Method", the Society of Materials Science, Japan, 1981, published by Yokendo Ltd. Publishers). It is noted that the temperature is room temperature (20° C.) in this measurement. As long as the same cutting tool 10 is used for the measurement, it has also been confirmed that there is no variation in the measurement results even if measurement points are arbitrarily selected.

<Third Layer>
<Composition of the Third Layer>

Third layer 5 is composed of TiCN. Herein, the phrase "being composed of TiCN" means that unavoidable impurities can be included in addition to TiCN as long as the effects of the present disclosure are exhibited. Examples of the unavoidable impurities include, for example, chlorine atoms (Cl) and the like. The content rate of the total unavoidable impurities in third layer 5 may be greater than 0% by mass and less than 3% by mass.

Third layer 5 being composed of TiCN is measured by an X-ray diffraction (XRD) method and an energy dispersive X-ray analysis (EDX). In third layer 5, the content rate of unavoidable impurities is measured by secondary ion mass spectrometry (SIMS). As long as the measurement is carried out on the same cutting tool 10, it has been confirmed that there is no variation in the measurement results even if measurement points are arbitrarily selected.

<Structure of the Third Layer>

A thickness of third layer 5 may be 2 μm or more or 12 μm or less. This enables achievement of both superior chipping resistance and superior wear resistance, whereby a cutting tool with a longer tool service life, particularly even in intermittent turning of cast iron, can be provided. The thickness of third layer 5 may be 4 μm or more and 10 μm or less, or 5 μm or more and 7 μm or less.

<Residual Stress of the Third Layer>

A residual stress Y of third layer 5 may be −1.0 GPa or more and 1.0 GPa or less. This allows cutting tool 10 to be imparted with both superior wear resistance and superior chipping resistance, making it possible to provide a cutting tool with a longer tool service life, particularly even in intermittent turning of cast iron. Residual stress Y of third layer 5 may be −1.0 GPa or more and 0.5 GPa or less, or −1.0 GPa or more and 0.1 GPa or less.

Residual stress Y of third layer 5 can be identified by the same measurement method as that for residual stress X of second layer 4, except that the measurement is carried out on third layer 5. As long as the measurement is carried out on the same cutting tool 10, it has been confirmed that there is no variation in the measurement results even if the measurement points are arbitrarily selected.

<Fourth Layer>
<Composition of the Fourth Layer>

Fourth layer 6 is composed of TiN. Herein, the phrase "being composed of TiN" means that unavoidable impurities can be included in addition to TiN as long as the effects of the present disclosure are exhibited. The unavoidable impurities include, for example, chlorine atoms (Cl) and the like. The content rate of the total unavoidable impurities in fourth layer 6 may be greater than 0% by mass and less than 3% by mass.

Fourth layer 6 being composed of TiN is identified by an X-ray diffraction (XRD) method and an energy dispersive X-ray analysis (EDX). In fourth layer 6, the content rate of unavoidable impurities is measured by secondary ion mass spectrometry (SIMS). Note, however, as long as the measurement is carried out on the same cutting tool 10, it has been confirmed that there is no variation in the measurement results even if measurement points are selected arbitrarily.

<Structure of the Fourth Layer>

A thickness of fourth layer 6 may be 0.1 μm or more and 0.5 μm or less. This enables achievement of both superior chipping resistance and superior wear resistance, whereby a cutting tool with a longer tool service life, particularly even in intermittent turning of cast iron, can be provided. The thickness of fourth layer 6 may be 0.2 μm or more and 0.4 μm or less.

<Other Layers>

Examples of other-layers can include, for example, a base layer (not shown), an intermediate layer (not shown), a surface layer (not shown), and the like. The base layer is, when the third layer is present, a layer positioned between substrate 1 and third layer 5, or it is, when the third layer is absent, a layer between substrate 1 and first layer 3. The surface layer is a layer positioned on a surface of coated film 2. The intermediate layer is a layer positioned between third layer 5 and first layer 3, between first layer 3 and second layer 4, or between second layer 4 and fourth layer 6. Note, however, the intermediate layer is a thin adhesion layer such as TiCNO. Therefore, the intermediate layer does not affect a stress distribution.

Embodiment 2: Manufacturing Method of Cutting Tool

Figure 4:
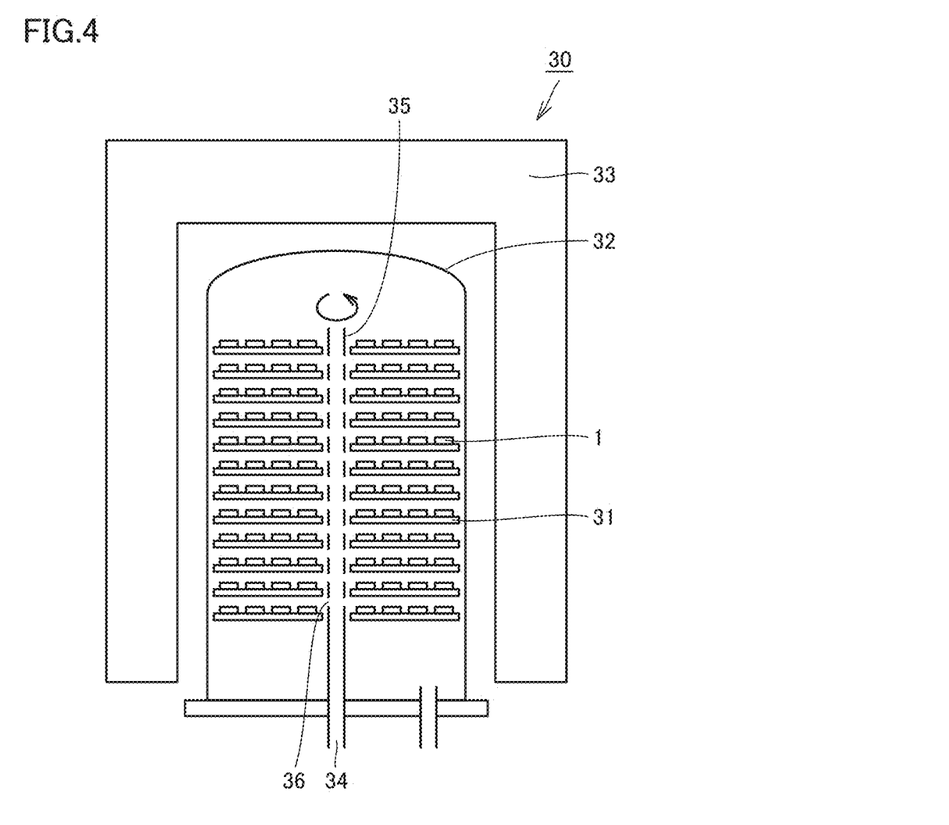
FIG. 4 is a schematic cross-sectional view of an example of a CVD (Chemical Vapor Deposition) apparatus used in manufacturing of the cutting tool of the present disclosure.

A method for manufacturing the cutting tool of the present embodiment will be described using FIG. 4. FIG. 4 is a schematic cross-sectional view of an example of a CVD apparatus used in the manufacturing of the cutting tool of the present embodiment.

The method for manufacturing the cutting tool of the present embodiment is a method for manufacturing the cutting tool described in Embodiment 1, including
the first step of preparing a substrate,
the second step of forming a coated film on the substrate, and
the third step of subjecting the coated film to blast processing, to obtain a cutting tool.
wherein the second step includes the second A step of forming the first layer by a CVD method, and the second B step of forming the second layer by the CVD method, in this order. The second step may further include a second C step of forming the third layer by the CVD method prior to the second A step. The second step may further include a second D step of forming the fourth layer by the CVD method after the second B step. Details of each step will be described below.

<<First Step>>

In the first step, a substrate is prepared. The substrate can be the substrate described in Embodiment 1.

For example, when a cemented carbide is used as the substrate, a commercially available substrate may be used, or the substrate may be manufactured by a general powder metallurgical method. In the case of the manufacturing by the general powder metallurgical method, for example, WC powder, Co powder, and the like, are mixed by a ball mill or the like to obtain mixed powder. After drying the mixed powder, it is formed into a predetermined shape to obtain a formed material. The formed material is then sintered to obtain a WC—Co cemented carbide (sintered material). Next, the sintered material is subjected to predetermined cutting edge processing, such as honing, to be able to manufacture a substrate composed of a WC—Co cemented carbide. A substrate other than those described above can also be prepared, as long as it is conventionally known as a substrate of this type.

<<Second Step>>

In the second step, a coated film is formed on the substrate described above to obtain a cutting tool. The formation of the coated film is performed, for example, by using the CVD apparatus shown in FIG. 4. A CVD apparatus 30 is equipped with a plurality of substrate-setting jigs 31 for holding substrate 1 and a reaction vessel 32 made of heat-resistant alloy steel covering substrate-setting jigs 31. Moreover, at a circumference of reaction vessel 32, a temperature regulator 33 is arranged for controlling temperature inside reaction vessel 32. Reaction vessel 32 is provided with a gas inlet pipe 35 having a gas inlet port 34. Gas inlet pipe 35 is arranged so as to extend toward a vertical direction and be rotatable about an axis in the vertical direction, in an inner space of reaction vessel 32 where substrate-setting jigs 31 is arranged, and is provided with a plurality of blowout holes (through holes 36) for allowing gas to blow out into reaction vessel 32. By using this CVD apparatus 30, the third layer, first layer, second layer, and fourth layer, which constitute the aforementioned coated film, can be formed as follows.

In a case in which the coated film includes the "other layers" described in Embodiment 1, the "other layers" can be formed by conventionally known methods.

<Second C Step: Step of Forming the Third Layer by a CVD Method>

In the second C step, the first layer is formed by the CVD method. More specifically, first, substrate 1 is arranged on substrate-setting jig 31, and while controlling temperature and pressure in reaction vessel 32 to a predetermined range, a raw material gas for the first layer is introduced into reaction vessel 32 from gas inlet pipe 35. This allows the third layer to be formed on substrate 1.

As the raw material gas for the third layer, a mix gas of $TiCl_4$, $CH_3CN$, $CO$, $N_2$, $HCl$, and $Hn$ is used.

The content rate of $TiCl_4$ in the mixed gas may be 8.0% by volume or more and 9.0% by volume or less. The content rate of $CH_3CN$ in the mixed gas may be 0.2% by volume or more and 1.0% by volume or less. The content rate of CO in the mixed gas may be 1.3% by volume or more and 2.0% by volume or less. The content rate of $N_2$ in the mixed gas may be 8.0% by volume or more and 12.0% by volume or less. The content rate of HCl in the mixed gas may be 1.0% by volume or more and 3.0% by volume or less.

A temperature in reaction vessel 32 may be controlled at 800° C. or more and 850° C. or less, and pressure in reaction vessel 32 may be controlled at 100 hPa or more and 120 hPa or less. Note, however, gas inlet pipe 35 may be rotated upon introduction of gas.

With respect to the aforementioned manufacturing method, control of each condition of the CVD method changes an aspect of the third layer. For example, by adjusting a deposition time, a thickness of the third layer is controlled.

<Second a Step: Step of Forming the First Layer by the CVD Method>

In the second A step, the first layer is formed by the CVD method. More specifically, first, when the second D step is performed, a first cutting tool precursor in which the third layer has been formed on a substrate is arranged on substrate-setting jig 31, and while controlling temperature and pressure in reaction vessel 32 to a predetermined range, a raw material gas for the first layer is introduced into reaction vessel 32 from gas inlet pipe 35. This allows the first layer to be formed on the third layer. Alternatively, when the second D step is not performed, substrate 1 is arranged on substrate-setting jig 31, and while controlling temperature and pressure in reaction vessel 32 to a predetermined range, a raw material gas for the first layer is introduced into reaction vessel 32 from gas inlet pipe 35. This allows the first layer to be formed on the substrate.

As the raw material gas for the first layer, a mixed gas of $AlCl_3$, $CO_2$, $H_2S$, and $H_2$ is used.

The content rate of $AlCl_3$ in the mixed gas may be 2.0% by volume or more and 2.5% by volume or less. The content rate of $CO_2$ in the mixed gas may be 2.5% by volume or more and 3.5% by volume or less. The content rate of $H_2S$ in the mixed gas may be 0.5% by volume or more and 1.0% by volume or less.

A temperature in reaction vessel 32 may be controlled at 980° C. or more and 1015° C. or less, and pressure in reaction vessel 32 may be controlled at 60 hPa or more and 75 hPa or less. It is noted that gas inlet pipe 35 may be rotated upon introduction of gas.

With respect to the aforementioned manufacturing method, control of each condition of the CVD method changes an aspect of the first layer. For example, by adjusting a deposition time, a thickness of the first layer is controlled.

<Second B Step: Step of Forming the Second Layer by the CVD Method>

In the second B step, the second layer is formed by the CVD method. More specifically, first, the second cutting tool precursor in which the first layer has been formed on a substrate is arranged on substrate-setting jig 31, and while controlling temperature and pressure in reaction vessel 32 to a predetermined range, a raw material gas for the second layer is introduced into reaction vessel 32 from gas inlet pipe 35. This allows the second layer to be formed on the first layer.

As the raw material gas for the second layer, a mix gas of $TiCl_4$, $CH_3CN$, $CO$, $N_2$, $HCl$, and $H_2$ is used.

The content rate of $TiCl_4$ in the mixed gas may be 8.0% by volume or more and 9.0% by volume or less. The content rate of $CH_3CN$ in the mixed gas may be 0.2% by volume or more and 0.8% by volume or less. The content rate of CO in the mixed gas may be 1.3% by volume or more and 2.0% by volume or less. The content rate of NZ in the mixed gas may be 8.0% by volume or more and 12.0% by volume or less. The content rate of HCl in the mixed gas may be 0.5% by volume or more and 2.0% by volume or less.

A temperature in reaction vessel 32 is controlled at 850° C. or more and 950° C. or less, and pressure in reaction vessel 32 is controlled at 100 hPa or more and 110 hPa or less. Note, however, gas inlet pipe 35 may be rotated upon introduction of gas.

With respect to the aforementioned manufacturing method, control of each condition of the CVD method changes an aspect of the second layer. For example, by adjusting a deposition time, a thickness of the second layer is controlled.

<Second D Step: Step of Forming the Fourth Layer by the CVD Method>

In the second D step, the fourth layer is formed by the CVD method. More specifically, first, a third cutting tool precursor in which the second layer was formed on the first layer is arranged on substrate-setting jig 31, and while controlling temperature and pressure in reaction vessel 32 to a predetermined range, a raw material gas for the fourth layer is introduced into reaction vessel 32 from gas inlet pipe 35. This allows the fourth layer to be formed on the second layer.

As the raw material gas for the fourth layer, a mixed gas of $TiCl_4$, $N_2$, $HCl$, and $H_2$ is used.

The content rate of $TiCl_4$ in the mixed gas may be 3% by volume or more and 7% by volume or less. The content rate of $N_2$ in the mixed gas may be 20% by volume or more and 30% by volume or less. The content rate of HCl in the mixed gas may be 5% by volume or more and 10% by volume or less.

A temperature in reaction vessel 32 may be controlled at 800° C. or more and 1000° C. or less, and pressure in reaction vessel 32 may be controlled at 100 hPa or more and 110 hPa or less. Note, however, gas inlet pipe 35 may be rotated upon introduction of gas.

With respect to the aforementioned manufacturing method, control of each condition of the CVD method changes an aspect of the fourth layer. For example, by adjusting a deposition time, a thickness of the fourth layer is controlled.

<Third Step; Step of Subjecting a Coated Film to Blast Processing to Obtain a Cutting Tool>

In the third step, a coated film is subjected to blast processing to obtain a cutting tool. The "blast processing" herein refers to processing in which a large number of small spheres (media) of steel, a nonferrous metal (for example, a ceramic), or the like is collided (projected) onto a surface of a coated film, such as a rake face at high speed, to change various properties of the surface, such as a residual stress.

Examples of the type of medium include a ceramic, zirconia, alumina, and the like.

An average particle size of the media is more than 15 μm and 30 μm or less.

A concentration of the media to be projected is 100 g/min or more and 350 g/min or less.

A distance between a projection area where the media are projected and a surface of a coated film (hereinafter also referred to as "projection distance") is 20 mm or more and less than 30 mm.

A projection angle of the media is 45° to a surface of a coated film.

Pressure applied to the aforementioned media upon projection (hereinafter also referred to as "projection pressure") is 0.10 MPa or more and 0.50 MPa or less.

A processing time of blast processing is 20 seconds or more and 50 seconds or less.

Each condition of the aforementioned blast processing can be appropriately adjusted according to a composition of the aforementioned coated film.

<Other Steps>

In the manufacturing method according to the present embodiment, an additional step may be appropriately carried out in addition to the steps described above, to the extent that the effects of the present embodiment are not impaired.

<Characteristics of the Manufacturing Method of a Cutting Tool of the Present Embodiment>

By the aforementioned manufacturing method, a cutting tool including a substrate and a coated film arranged on the substrate, wherein the coated film includes a first layer positioned on the substrate and a second layer positioned on the first layer, the first layer is composed of $\alpha\text{-}Al_2O_3$, the second layer is composed of TiCN, a thickness of the second layer is 0.5 μm or more and less than 2.0 μm, and a residual stress X of the second layer is −2.0 GPa or more and −0.5 GPa or less, can be manufactured. The reason therefore is surmised as follows.

The method for manufacturing a cutting tool of the present embodiment is characterized in that particularly the second step includes the second A step and second B step, wherein the second B step is implemented by adjusting a deposition time so that a thickness of the second layer is 0.5 μm or more and less than 2.0 μm, controlling temperature in reaction vessel 32 at 850° C. or more and 950° C. or less, controlling pressure in reaction vessel 32 at 100 hPa or more and 110 hPa or less, and the third step is implemented under the conditions of an average particle size of media of more than 15 μm and 30 μm or less, a concentration of the media to be projected of 100 g/min or more and 350 g/min or less, a projection distance of 20 mm or more and less than 30 mm, a projection angle of the media of 45° to a surface of a coated film, projection pressure of 0.10 MPa or more and 0.50 MPa or less, and a processing time of blast processing of 20 seconds or more and 50 seconds or less. This enables inhibiting wear and tear of the second layer due to blast processing and effectively applying a compressive residual stress to the second layer. Thus has been newly found by the present inventors as a result of their diligent investigations.

EXAMPLES

The present embodiment will be more specifically described by way of Examples. However, the present embodiment is not limited by these Examples.
<<Fabrication of Cutting Tool>>
Cutting tools according to samples 1 to 22 and 101 to 107 were prepared in the following manner.
<First Step>
An indexable cutting inset made of a cemented carbide (SEET I3T3AGSN-0, manufactured by Sumitomo Electric Hardmetal Corp.) with a composition composed of Co (6% by mass), and WC (the residual percentage by mass) (provided that unavoidable impurities were contained), was prepared as a substrate,
<Second Step>
For each of sample 19 to sample 22, sample 106, and sample 107, the third layer was formed on the above substrate by the CVD method under the following conditions so that a composition of the third layer was as described in Tables 5 and 6 (the second C step). A deposition time was appropriately adjusted so that a thickness of the third layer was as described in Tables 5 and 6.
(Conditions of the Second C Step)
  The content rate of $TiCl_4$ in the mixed gas: 8.0 to 9.0% by volume.
  The content rate of $CH_3CN$ in the mixed gas: 0.2 to 1.0% by volume.
  The content rate of CO in the mixed gas: 1.3 to 2.0% by volume.
  The content rate of $N_2$ in the mixed gas: 8.0 to 12.0% by volume.
  The content rate of HCl in the mixed gas: 1.0 to 3.0% by volume.
  The content rate of $H_2$ in the mixed gas: The residual percentage by volume.
  Temperature: 800 to 850° C.
  Pressure: 100 to 120 hPa
Next, for each of sample 19 to sample 22, sample 106, and sample 107, the first layer was formed on the above third layer by the CVD method under the following conditions so that a composition of the first layer was as described in Tables 3 and 4 (the second A step). For each of sample 1 to sample 18 and sample 101 to sample 105, the first layer was formed on the above substrate by the CVD method under the following conditions so that a composition of the first layer was as described in Tables 5 and 6 (the second A step). A deposition time was appropriately adjusted so that a thickness of the first layer was as described in Tables 5 and 6. The content rate of $H_2S$ in the mixed gas was appropriately adjusted within the following range so that an orientation index TC (0 0 12) of the first layer was as described in Tables 5 and 6.
(Conditions of the Second a Step)
  The content rate of $AlCl_3$ in the mixed gas: 2.0 to 2.5% by volume.
  The content rate of $CO_2$ in the mixed gas: 2.5 to 3.5% by volume.
  The content rate of $H_2S$ in the mixed gas: 0.5 to 1.0% by volume.
  The content rate of $H_2$ in the mixed gas: The residual percentage by volume.
  Temperature: 980 to 1015° C.
  Pressure: 60 to 75 hPa
Next, for each of sample 1 to sample 22, sample 102 to sample 104, sample 106, and sample 107, the second layer was formed on the above first layer by the CVD method under the following conditions so that a composition of the second layer was as described in Tables 5 and 6 (the second H step). A deposition time was appropriately adjusted so that a thickness of the third layer was as described in Tables 5 and 6.
(Conditions of the Second B Step)
  The content rate of $TiCl_4$ in the mixed gas: 8.0 to 9.0% by volume.
  The content rate of $CH_3CN$ in the mixed gas: 0.2 to 0.8% by volume.
  The content rate of CO in the mixed gas: 1.3 to 20%$_9$ by volume.
  The content rate of $N_2$ in the mixed gas: 8.0 to 12.0% by volume.
  The content rate of HCl in the mixed gas: 0.5 to 2.0% by volume.
  The content rate of $H_2$ in the mixed gas: The residual percentage by volume.
  Temperature: As described in Tables 1 and 2
  Pressure: As described in Tables 1 and 2
For sample 105, the second layer was formed on the above first layer by the CVD method under the following conditions so that a composition of the second layer was as described in Table 6 (the second B step). A deposition time was appropriately adjusted so that a thickness of the second layer was as described in Table 6.
(Conditions of the Second B Step)
  The content rate of $AlCl_3$ the mixed gas: 6.0% by volume.
  The content rate of $NH_3$ in the mixed gas: 1.5% by volume.
  The content rate of $H_2$ in the mixed gas: The residual percentage by volume.
  Temperature: As described in Table 2
  Pressure: As described in Table 2
Note, however, for sample 101, the second B step was not carried out.
From all those described above, for each of sample 1 to sample 22 and sample 101 to sample 107, a coated film was formed on a substrate.
<Third Step>
Blast processing was performed on a surface of the coated film under the conditions described in Tables 3 and 4.
The cutting tools according to samples 1 to 22 and 101 to 107 were prepared by the procedure described above.

TABLE 1

| | Conditions of the second B step | |
|---|---|---|
| Sample No. | Temperature [° C.] | Pressure [hPa] |
| 1 | 900 | 100 |
| 2 | 900 | 100 |
| 3 | 900 | 100 |
| 4 | 900 | 100 |
| 5 | 900 | 100 |
| 6 | 900 | 100 |
| 7 | 900 | 100 |
| 8 | 900 | 100 |
| 9 | 900 | 100 |
| 10 | 900 | 100 |

TABLE 1-continued

| | Conditions of the second B step | |
|---|---|---|
| Sample No. | Temperature [° C.] | Pressure [hPa] |
| 11 | 900 | 100 |
| 12 | 900 | 100 |
| 13 | 900 | 100 |
| 14 | 900 | 100 |
| 15 | 900 | 100 |
| 16 | 900 | 100 |
| 17 | 900 | 100 |
| 18 | 900 | 100 |
| 19 | 900 | 100 |
| 20 | 900 | 100 |
| 21 | 900 | 100 |
| 22 | 900 | 100 |

TABLE 2

| | Conditions of the second B step | |
|---|---|---|
| Sample No. | Temperature [° C.] | Pressure [hPa] |
| 101 | — | — |
| 102 | 900 | 100 |
| 103 | 900 | 100 |
| 104 | 900 | 100 |
| 105 | 800 | 15 |
| 106 | 975 | 90 |
| 107 | 875 | 90 |

TABLE 3

| | | Conditions of the third step | | | | | |
|---|---|---|---|---|---|---|---|
| | | Media | | | | | Rotational |
| Sample No. | Type | Average particle size [μm] | Concentration [g/min] | Projection angle [°] | Projection distance [mm] | Projection pressure [MPa] | Time [sec] | speed of cutting tool [rpm] |
| 1 | Ceramic | 20 | 340 | 45 | 25 | 0.30 | 40 | 60 |
| 2 | Ceramic | 20 | 230 | 45 | 25 | 0.40 | 30 | 60 |
| 3 | Ceramic | 20 | 300 | 45 | 25 | 0.80 | 45 | 60 |
| 4 | Ceramic | 20 | 290 | 45 | 25 | 0.10 | 40 | 60 |
| 5 | Ceramic | 20 | 100 | 45 | 25 | 0.50 | 40 | 60 |
| 6 | Ceramic | 20 | 340 | 45 | 25 | 0.40 | 20 | 60 |
| 7 | Ceramic | 20 | 120 | 45 | 25 | 0.40 | 20 | 60 |
| 8 | Ceramic | 20 | 160 | 45 | 25 | 0.80 | 45 | 60 |
| 9 | Ceramic | 20 | 150 | 45 | 25 | 0.30 | 30 | 60 |
| 10 | Ceramic | 20 | 170 | 45 | 25 | 0.50 | 40 | 60 |
| 11 | Ceramic | 20 | 350 | 45 | 25 | 0.30 | 40 | 60 |
| 12 | Ceramic | 20 | 200 | 45 | 25 | 0.20 | 20 | 60 |
| 13 | Ceramic | 20 | 260 | 45 | 25 | 0.30 | 40 | 60 |
| 14 | Ceramic | 20 | 210 | 45 | 25 | 0.50 | 40 | 60 |
| 15 | Geramic | 20 | 220 | 45 | 25 | 0.50 | 30 | 60 |
| 16 | Ceramic | 20 | 130 | 45 | 25 | 0.50 | 45 | 60 |
| 17 | Ceramic | 20 | 330 | 45 | 25 | 0.50 | 45 | 60 |
| 18 | Ceramic | 20 | 230 | 45 | 25 | 0.20 | 30 | 60 |
| 18 | Ceramic | 30 | 280 | 45 | 25 | 0.50 | 50 | 60 |
| 20 | Ceramic | 20 | 290 | 45 | 25 | 0.50 | 45 | 60 |
| 21 | Ceramic | 30 | 310 | 45 | 25 | 0.30 | 50 | 60 |
| 22 | Ceramic | 20 | 120 | 45 | 25 | 0.50 | 45 | 60 |

TABLE 4

| | | Conditions of the third step | | | | | |
|---|---|---|---|---|---|---|---|
| | | Media | | | | | Rotational |
| Sample No. | Type | Average particle size [μm] | Concentration [g/min] | Projection angle [°] | Projection distance [mm] | Projection pressure [MPa] | Time [sec] | speed of cutting tool [rpm] |
| 101 | Ceramic | 20 | 240 | 45 | 25 | 0.30 | 30 | 60 |
| 102 | Ceramic | 20 | 250 | 45 | 25 | 0.30 | 30 | 60 |
| 103 | Ceramic | 20 | 300 | 45 | 25 | 0.50 | 55 | 60 |
| 104 | Ceramic | 20 | 290 | 45 | 25 | 0.05 | 20 | 60 |
| 106 | Ceramic | 20 | 130 | 45 | 25 | 0.20 | 20 | 60 |
| 106 | Ceramic | 150 | 200 | 75 | 50 | 0.30 | 28 | 60 |
| 107 | Ceramic | 10 | 200 | 45 | 40 | 0.30 | 20 | 60 |

TABLE 5

| Sample No. | Third layer Composition | Third layer Thickness [μm] | Third layer Y [GPa] | First layer Composition | First layer Thickness [μm] | First layer TC (0 0 12) | Second layer Composition | Second layer Thickness [μm] | Second layer X [GPa] | Thickness [μm] | Tool service life [min] |
|---|---|---|---|---|---|---|---|---|---|---|---|
| 1 | — | — | — | α-Al$_2$O$_3$ | 7.2 | 3.9 | TiCN | 0.5 | −0.9 | 7.7 | 29 |
| 2 | — | — | — | α-Al$_2$O$_3$ | 3.4 | 7.4 | TiCN | 1.9 | −1.1 | 5.3 | 23 |
| 3 | — | — | — | α-Al$_2$O$_3$ | 3.3 | 4.3 | TiCN | 1.5 | −2.0 | 4.8 | 25 |
| 4 | — | — | — | α-Al$_2$O$_3$ | 4.3 | 3.1 | TiCN | 1.7 | −0.5 | 6.0 | 22 |
| 5 | — | — | — | α-Al$_2$O$_3$ | 9.7 | 4.9 | TiCN | 0.7 | −1.7 | 10.4 | 30 |
| 6 | — | — | — | α-Al$_2$O$_3$ | 13.1 | 3.8 | TiCN | 1.2 | −1.1 | 14.3 | 25 |
| 7 | — | — | — | α-Al$_2$O$_3$ | 9.5 | 6.4 | TiCN | 0.9 | −1.3 | 10.4 | 21 |
| 8 | — | — | — | α-Al$_2$O$_3$ | 5.1 | 7.7 | TiCN | 1.4 | −1.8 | 6.5 | 25 |
| 9 | — | — | — | α-Al$_2$O$_3$ | 3.0 | 6.6 | TiCN | 0.8 | −0.9 | 3.8 | 23 |
| 10 | — | — | — | α-Al$_2$O$_3$ | 15.0 | 8.0 | TiCN | 1.5 | −1.7 | 16.5 | 23 |
| 11 | — | — | — | α-Al$_2$O$_3$ | 2.8 | 5.4 | TiCN | 1.8 | −0.9 | 4.7 | 20 |
| 12 | — | — | — | α-Al$_2$O$_3$ | 15.1 | 3.9 | TiCN | 1.8 | −0.6 | 16.9 | 20 |
| 13 | — | — | — | α-Al$_2$O$_3$ | 5.5 | 3.0 | TiCN | 0.7 | −0.9 | 6.2 | 21 |
| 14 | — | — | — | α-Al$_2$O$_3$ | 9.4 | 2.9 | TiCN | 1.3 | −1.7 | 10.7 | 20 |
| 15 | — | — | — | α-Al$_2$O$_3$ | 9.5 | 5.6 | TiCN | 0.5 | −1.4 | 10.0 | 29 |
| 16 | — | — | — | α-Al$_2$O$_3$ | 4.5 | 3.5 | TiCN | 1.9 | −1.9 | 6.4 | 23 |
| 17 | — | — | — | α-Al$_2$O$_3$ | 9.8 | 6.8 | TiCN | 1.5 | −1.9 | 11.3 | 21 |
| 18 | — | — | — | α-Al$_2$O$_3$ | 5.6 | 7.2 | TiCN | 1.5 | −0.6 | 7.1 | 26 |
| 19 | TiCN | 6 | −1.0 | α-Al$_2$O$_3$ | 4.8 | 3.2 | TiCN | 1.5 | −1.4 | 12.8 | 22 |
| 20 | TiCN | 6 | 1.0 | α-Al$_2$O$_3$ | 7.2 | 4.5 | TiCN | 1.7 | −1.9 | 14.9 | 25 |
| 21 | TiCN | 6 | −1.1 | α-Al$_2$O$_3$ | 10.2 | 5.3 | TiCN | 0.6 | −1.0 | 16.8 | 20 |
| 22 | TiCN | 6 | 1.1 | α-Al$_2$O$_3$ | 7.5 | 3.9 | TiCN | 1.5 | −1.9 | 15.0 | 20 |

TABLE 6

| Sample No. | Third layer Composition | Third layer Thickness [μm] | Third layer Y [GPa] | First layer Composition | First layer Thickness [μm] | First layer TC (0 0 12) | Second layer Composition | Second layer Thickness [μm] | Second layer X [GPa] | Thickness [μm] | Tool service life [min] |
|---|---|---|---|---|---|---|---|---|---|---|---|
| 101 | — | — | — | α-Al$_2$O$_3$ | 8.5 | 3.9 | — | — | — | 8.5 | 12 |
| 102 | — | — | — | α-Al$_2$O$_3$ | 6.8 | 5.8 | TiCN | 2.1 | −1.0 | 8.9 | 15 |
| 103 | — | — | — | α-Al$_2$O$_3$ | 6.0 | 3.8 | TiCN | 0.7 | −2.1 | 8.7 | 13 |
| 104 | — | — | — | α-Al$_2$O$_3$ | 8.6 | 6.9 | TiCN | 0.7 | −0.4 | 9.3 | 12 |
| 105 | — | — | — | α-Al$_2$O$_3$ | 5.6 | 7.5 | AlTiN | 3.5 | −0.6 | 9.1 | 9 |
| 106 | TiCN | 6 | −0.6 | α-Al$_2$O$_3$ | 7.0 | 4.1 | TiCN | 3.0 | −0.3 | 16.0 | 10 |
| 107 | TiCN | 6 | −0.6 | α-Al$_2$O$_3$ | 5.2 | 3.2 | TiCN | 3.0 | −0.6 | 14.2 | 12 |

<<Evaluation of Characteristics of Cutting Tool>>
<Composition of the First Layer>

For each of the cutting tools according to each sample, the composition of the first layer was determined by the method described in Embodiment 1. The results obtained are denoted in the "Composition" columns of the "First layer" column in each of Tables 5 and 6. When described as the "α-Al$_2$O$_3$" in the "Composition" columns of the "First layer" column in each of Tables 5 and 6, the first layer refers to that which is composed of α-Al$_2$O$_3$.

<Orientation Index TC (0 0 12) of the First Layer>

For each of the cutting tools according to each sample, the orientation index TC (0 0 12) of the first layer was determined by the method described in Embodiment 1. The results obtained are denoted in the "TC (0 0 12)" column in the "First layer" column in each of Tables 5 and 6.

<Composition of the Second Layer<

For each of the cutting tools according to each sample, the composition of the second layer was determined by the method described in Embodiment 1. The results obtained are denoted in the "Composition" columns of the "Second layer" column in each of Tables 5 and 6. When described as "TiCN" in the "Composition" columns of the "Second layer" column in each of Tables 5 and 6, the second layer refers to that which is composed of TiCN.

<Residual Stress X of the Second Layer>

For each of the cutting tools according to each sample, residual stress X of the second layer was determined by the method described in Embodiment 1. The results obtained are denoted in the "X [GPa]" columns in each of Tables 5 and 6.

<Composition of the Third Layer>

For each of the cutting tools according to each sample, the composition of the third layer was determined by the method described in Embodiment 1. The results obtained are denoted in the "Composition" columns of the "Third layer" column in each of Tables 5 and 6. When described as "TiCN" in the "Composition" columns of the "Third layer" column in each of Tables 5 and 6, the third layer refers to that which is composed of TiCN.

<Residual Stress Y of the Third Layer>

For each of the cutting tools according to each sample, residual stress Y of the third layer was determined by the method described in Embodiment 1. The results obtained are denoted in the "Y [GPa]" columns in each of Tables 5 and 6.

<Thickness of Coated Film>

For each of the cutting tool according to each sample, a thickness of the coated film was determined by the method described in Embodiment 1. The results obtained are denoted in the "Thickness [µm]" columns of the "Coated film" column in each of Tables 5 and 6.

<Cutting Test>

A cutting test was carried out by using each of the cutting tools according to each sample under the following cutting conditions. A tool service life was measured as time when damage develops due to a combination of wear and chipping, and the maximum amount of flank face wear, Vbmax [mm] of a ridgeline portion of the cutting tool, exceeds 0.3 mm. The results obtained are denoted in the "Tool service life [min]" columns in each of Tables 5 and 6.

(Cutting Conditions)

Workpiece: FCD450 (round bar with flutes)
Processing: Turning of an outer diameter portion of a round bar with flutes
Cutting speed: 250 m/min
Feed rate: 0.2 mm/rev
Cutting fluid: Water soluble cutting oil The above cutting conditions correspond to the cutting conditions in intermittent turning of cast iron.

The cutting tools according to samples 1 to 22 correspond to Examples. The cutting tools according to samples 101 to 107 correspond to Comparative Examples. From the results of Tables 5 and 6, compared to the cutting tools according to samples 101 to 107, the cutting tools according to samples 1 to 22 were found to have a longer tool service life, even in intermittent turning of cast iron.

From all those described above, it was found that the cutting tools according to samples 1 to 22 have a long tool service life even in intermittent turning of cast iron.

The embodiments and Examples of the present disclosure have been described as above, and it is contemplated from the beginning to appropriately combine the configurations of each of the embodiments and Examples described above, or to variously modify them.

The embodiments and Examples disclosed herein are in all respects illustrative and should not be considered limitative. The scope of the present invention is indicated by the claims, not by the aforementioned embodiments and Examples, and is intended to include the scope of the claims, the meanings of equivalence thereof, and all changes within the scope.

REFERENCE SIGNS LIST

1 Substrate; 2 Coated film: 3 First layer; 4 Second layer; 5 Third layer; 6 Fourth layer; 10 Cutting tool; 30 CVD apparatus; 31 Substrate-setting jig; 32 Reaction vessel; 33 Temperature controller; 34 Gas inlet port; 35 Gas inlet pipe; 36 Through hole.

The invention claimed is:

1. A cutting tool comprising a substrate and a coated film arranged on the substrate,
    wherein the coated film comprises a first layer positioned on the substrate and a second layer positioned on the first layer,
    wherein the first layer is composed of $\alpha\text{-}Al_2O_3$,
    wherein the second layer is composed of TiCN,
    wherein a thickness of the second layer is 0.5 µm or more and less than 2.0 µm,
    wherein a residual stress X of the second layer is −2.0 GPa or more and −0.5 GPa or less.

2. The cutting tool according to claim 1, wherein the thickness of the first layer is 3.0 µm or more and 15.0 µm or less.

3. The cutting tool according to claim 1, wherein an orientation index TC (0 0 12) of the first layer is 3.0 or more.

4. The cutting tool according to claim 1, wherein the coated film further comprises a third layer positioned between the substrate and the first layer,
    wherein the third layer is composed of TiCN,
    wherein a residual stress Y of the third layer is −1.0 GPa or more and 1.0 GPa or less.

\* \* \* \* \*